March 14, 1961  R. MANGO  2,974,325
CONVERTIBLE BED
Filed March 10, 1958  2 Sheets-Sheet 1
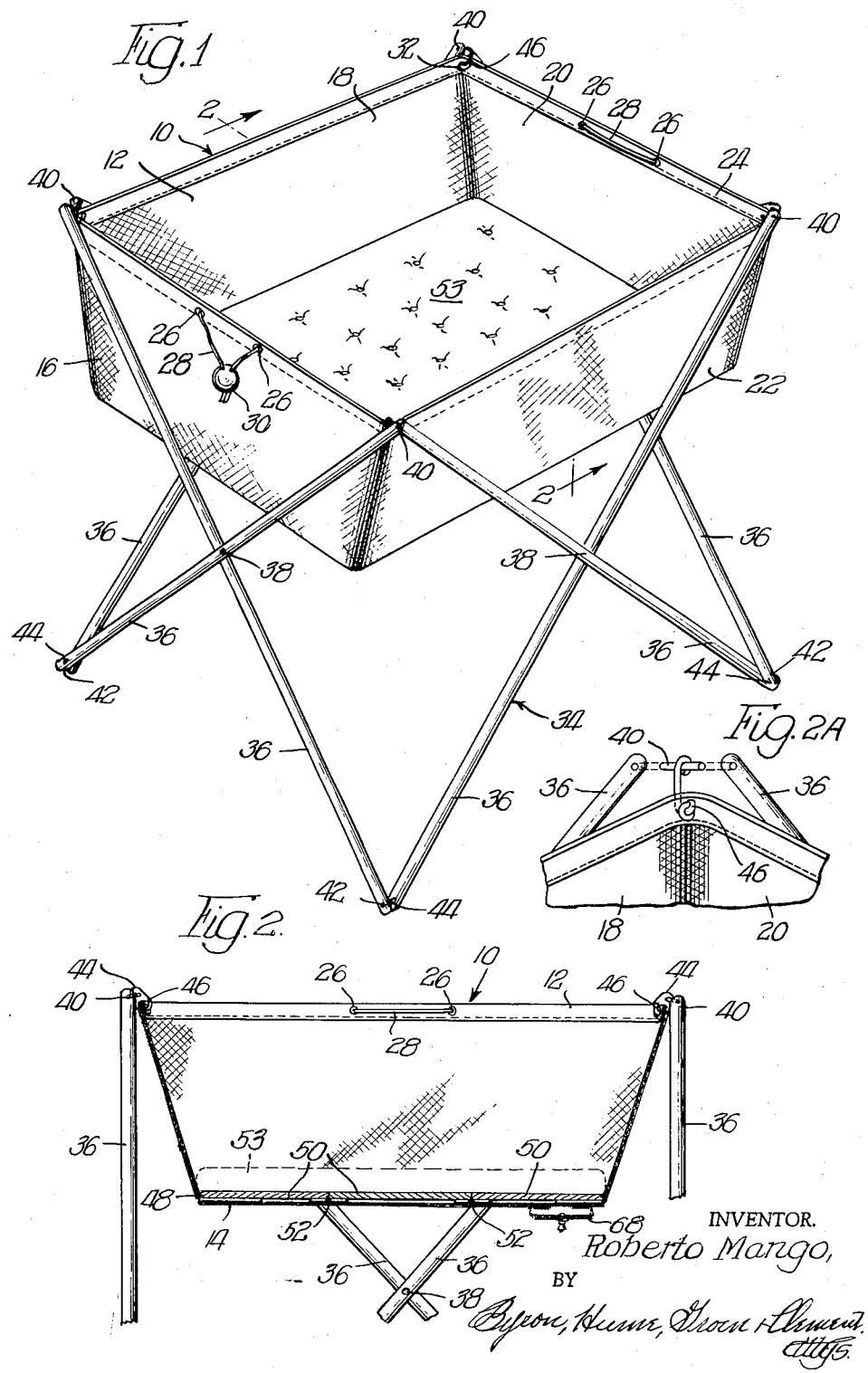
INVENTOR.
Roberto Mango,
BY March 14, 1961 R. MANGO 2,974,325
CONVERTIBLE BED
Filed March 10, 1958 2 Sheets-Sheet 2
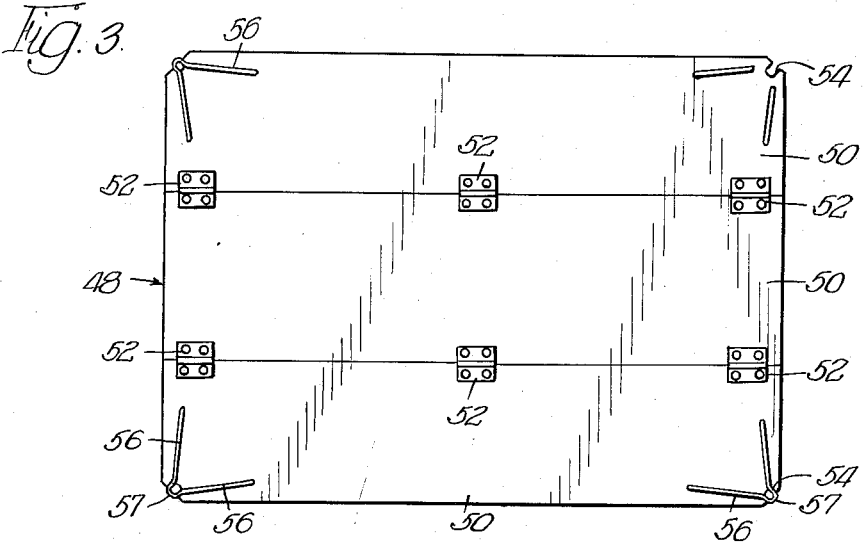
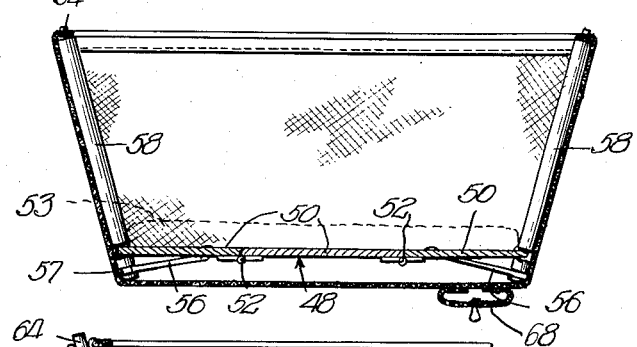
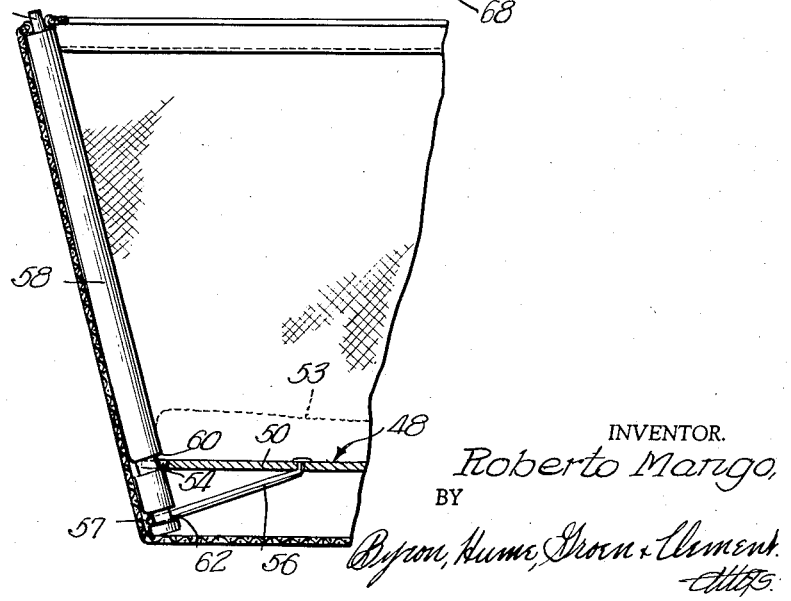
INVENTOR.
Roberto Mango,
BY
Byron, Hume, Groen & Clement
Attys.

United States Patent Office 2,974,325
Patented Mar. 14, 1961

2,974,325

CONVERTIBLE BED

Roberto Mango, Largo Ferrantine 1, Naples, Italy

Filed Mar. 10, 1958, Ser. No. 734,810

(Filed under Rule 47(b) and 35 U.S.C. 118)

5 Claims. (Cl. 5—98)

This invention relates to beds and in particular to a bed which may be used as either a baby crib or an auto bed.

Due to the rapid rate of growth of infants, baby furniture such as cribs, auto beds, and the like, that is particularly adapted for infants up to one year of age, generally has a limited period of use. In many instances, such items of furniture must be discarded after only a few months of use because they can no longer accommodate the baby due to its size. At the same time many of these items such as cribs and car beds are relatively expensive and because of their short useful life, this expense is considerably enhanced.

Therefore, it is an object of the invention provide a bed that has a plurality of useful purposes inasmuch as it may be used as a crib or a car bed.

Another object of this invention is to provide a bed that is simple, economical, lightweight, and compact in construction.

Another object of the invention is to provide a bed that disassembles into a compact unit which may be conveniently stored or transported.

These and other objects will be apparent upon reading of the specification with reference to the drawings.

In the drawings:

Figure 1 is a perspective view of the bed embodying the invention when used as a crib.

Figure 2 is a sectional view taken along lines 2—2 in Figure 1.

Figure 2a is a fragmentary view showing in detail the corner construction of the invention.

Figure 3 is a bottom view of a floor member used in the construction of the invention.

Figure 4 is a sectional view of the bed embodying the invention when used as a car bed.

Figure 5 is a segmental sectioned view in detail of the car bed shown in Figure 4.

Referring now to Figure 1 there is shown a perspective view of a preferred construction of the invention when used as a crib. The bed, generally denoted by the numeral 10, embodying the invention includes a basket member 12. The basket member is constructed of a non-rigid material such as cloth or plastic, having the bottom surface 14 and the side walls 16, 18, 20, and 22. In the preferred form the side walls 16, 18, 20, and 22 are slightly longer at the top than the bottom so they slope slightly outward as they extend upwardly from the bottom surface 14. The tops of each of the sides are preferably folded over and sewn into place to form a hem 24, so as to prevent any tearing or raveling of the sides. Intermediate the ends of the sides 16 and 20 are the metal eyes 26 through which the cords 28 are threaded. The ends of the cords 28 are secured together as best shown in Figure 1 by some suitable means such as the plastic ball 30 so that the cords 28 may be used as handles for moving the basket. At each corner at the top of the basket are the eye members 32 which are used in assembling the crib and car bed as will be explained later on.

The basket 12, when used as a crib, is supported by the frame member generally denoted by the numeral 34. The frame member 34 is comprised of eight bars 36 arranged in four pairs, each of which are pivotally connected by the pin member 38 substantially midway between their ends. The upper ends 40 and the lower ends 42 of each pair of bars are pivotally secured to like ends of adjacent pairs by the pin members 44.

The frame 34 generally conforms to the rectangular shape of the basket, so that each pair of frame members is associated with one of the sides of the basket 12. A hook member 46 is disposed between the upper ends 40 of the bars and is mounted on each pin member 44 securing the ends together. The hook members 46 are turned inwardly as shown in the drawing and are adapted to detachably engage the eyes 32 at the corners of the basket 12. Once the basket is hooked into place, the frame members are limited in the amount they can expand by the length of the various sides of the basket 12. In this manner the basket 12 co-operates with the frame 34 so as to eliminate any tendency for the frame to collapse.

Referring now to Figure 2, there is shown a rigid floor member 48 which is of substantially the same shape as the bottom surface 14. The floor member 48 holds the sides 16, 18, 20, and 22 of the basket in spread position as can be seen from the drawings. The floor member 48 may be constructed of any suitable material such as wood, plastic, fiber board, or the like. In its preferred form the floor member 48 is constructed of three hinged sections as best shown in Figure 3. The three sections 50 are each substantially one-third of the width of the floor member 48 and are hinged together by the hinge members 52. The hinge members 52 are placed on the bottom side of the floor member 48 so as to provide a smooth upper surface and to prevent any buckling due to the weight of the infant. In this manner it is possible to provide a floor member of substantial width when in use but which may be folded into a compact unit when disassembled. A mattress 53 of some suitable type overlies the floor member 48 when the bed is in use.

At the corners of the floor member 48 are the arcuate recesses 54 which will be explained in greater detail later on. Also associated with each corner of the floor member 48 is a wire bracket 56 which is secured in such a manner as to allow a slight pivotal movement in a plane perpendicular to the floor member 48 for reasons that will be apparent later on.

Referring now to Figures 4 and 5, there are shown sectioned views of the bed 10 when it is used as a car bed. When used in this manner, the basket 12 is detached from the frame member 34 used in supporting it as a crib. Since the bed when used as a car bed will generally rest on the bottom surface 14, it is necessary to provide means for supporting the sides 16, 18, 20, and 22 of the basket. The sides are supported by the vertical rod members 58 which are used at each corner of the basket 12. The rod members 58 are preferably cylindrical in shape having the grooves 60 and 62 at their lower ends and the reduced diameter portion 64 at their upper ends, as can best be seen in Figure 5. When the rod members 58 are in the assembled position, the grooves 62 are received within the arcuate portions 57 of the brackets 56. The grooves 60 are received within the arcuate recess 54 at the corners of the floor member 48. The reduced diameter portions 64 at the upper ends of the rods 58 extend through the eyes 32 at the upper corners of the basket. The rod members 58 are substantially the same length as the height of the sides 16, 18, 20, and 22, so that the latter are maintained in taut condition when the rod members are assembled in the manner shown in Figures 4 and 5. After the rod members 58 have been assembled into place, the basket 12 is self-supporting. A pocket 68 is attached to the under side of the bottom 14 to provide a convenient place for storing the rod members when they are not in use.

From the foregoing description it can now be seen that the basket and the frame may be disassembled for storage or other purposes into a small compact bundle. In order to disassemble the crib it is merely necessary to remove the mattress 53 and the floor member 48. The mattress 53 may be rolled or folded into a small bundle and the sections 50 of the floor member 48 may be folded so that they are in a superimposed position. The frame 34 may then be collapsed or folded without removing the basket from the hooks 46. This last step may be accomplished by grasping two opposite upper corners of the frame 34 and collapsing the frame until the various bars are substantially parallel. The basket 12 due to its nonrigid characteristics will be folded within the frame members when in their collapsed condition.

If it should be desired to disassemble the car bed, then it is merely necessary to remove the rod members 58 along with the floor member 48 and the mattress 53. The rod members 58 may be placed in the pocket 68 and the basket then rolled into a small compact bundle. The mattress 53 and the floor member 48, of course, may be folded in the manner previously described.

It should be pointed out that there are several real and distinct advantages of my combination crib and auto bed over those previously known. One particular advantage is the fact that the bed may be used as a crib or as an auto bed, thus eliminating the necessity of buying separate items. As a result my invention makes it possible to economize in the acquisition of furniture or equipment necessary for the care of babies.

Another advantage of my invention is the elimination of hard wooden or wicker surfaces. By using a cloth or plastic basket all surfaces which would scratch the baby are eliminated.

A still further advantage is the combined lightness and strength of the bed, whether used as a crib or as an auto bed. The bed weighs several pounds less than the known beds that have been previously used.

Although a preferred embodiment of my invention has been described in the specification, it is to be understood that this is merely by way of example and not in any manner to be construed as a limitation. It is contemplated that certain modifications may be made within the scope of the claims without departing from the spirit of the invention.

I claim:

1. A bed adapted to be used as either a crib or an auto bed comprising: a rectangular basket constructed of a nonrigid material having a bottom surface and side walls upstanding therefrom; a support frame having a plurality of pairs of bars, each of said pairs of bars being pivotally attached together intermediate their ends, each of said pairs of bars being associated with one of said side walls when said basket member is supported by said support frame, and pin means for securing the upper and lower ends of said pairs of said bars to like ends of adjacent pairs of bars, and means at said upper ends for detachably securing said basket member to said support frame; a rectangular substantially rigid floor member holding said sides in spread position, said floor member having recesses at its corners; and rod members substantially the same height as said side walls, said rod members being held at their lower ends by said recesses, said rod members having means at their upper ends for attachment to said side walls, said rod members supporting said side walls when said basket is detached from said support frame.

2. A bed adapted to be used as either a crib or an auto bed comprising: a rectangular basket member constructed of a nonrigid material having a bottom surface and four adjoining side walls upstanding therefrom, an eye means at the upper corners of said basket; a support frame having four pairs of bars, each of said pairs of bars being pivotally attached together intermediate their ends, each of said pairs of bars being associated with one of said side walls when said basket is supported by said support frame, pin means pivotally securing the upper and lower ends of each of said pairs of bars to like ends of adjacent pairs of bars, and hook means mounted on said pin means at said upper ends detachably securing said basket member to said support frame; a rectangular substantially rigid floor member holding said side walls of said basket member in spread position, said floor member having arcuate recesses at its corners and bracket means mounted at the corners of said floor member; and rod members substantially the same height as said side walls, said rod members being held at one end by said recesses and said bracket members and being held at the other end by said eye means, said rod members supporting said side walls when said basket member is detached from said supporting frame.

3. A bed adapted to be used as either a crib or an auto bed comprising: a rectangular basket member constructed of a nonrigid material having a bottom surface and four adjoining side walls upstanding therefrom, an eye means at the upper corners of said basket; a support frame having four pairs of bars, each of said pairs of said bars being pivotally attached together intermediate their ends, each of said pairs of bars being associated with one of said side walls when said basket member is supported by said support frame, pin means pivotally securing the upper and lower ends of each of said pairs of bars to like ends of adjacent pairs of bars, and hook means mounted on said pin means at said upper ends detachably securing said basket member to said support frame; a rectangular substantially rigid floor member holding said side walls of said basket member in spread position, said floor member having arcuate recesses at its corners; and rod members substantially the same height as said side walls supporting said side walls when said basket is detached from said support frame, said rod members being held at one end by the same arcuate recesses and held at the other end by said eye means.

4. A bed adapted to be used as either a crib or an auto bed comprising: a rectangular basket member constructed of a nonrigid material having a bottom surface and four adjoining side walls upstanding therefrom, an eye means at the upper corners of said basket, and a rectangular substantially rigid floor member for holding said side walls of said basket member in spread position, said floor member having arcuate recesses at its corners; a support frame having four pairs of bars, each of said pairs of said bars being pivotally attached together intermediate their ends, each of said pairs of bars being associated with one of said side walls when said basket member is supported by said support frame, a pin means pivotally securing the upper and lower ends of each of said pairs of bars to like ends of adjacent pairs of bars, and hook means mounted on said pin means at said upper ends detachably securing said basket member to said support frame; and rod members substantially the same height as said side walls, said rod members being held at one end by the said arcuate recesses and held at the other end by said eye means, said rod members supporting said side walls when said basket is detached from said support frame.

5. A bed adapted to be used as either a crib or an auto bed comprising: a rectangular basket member constructed of a nonrigid material having a bottom surface and four adjoining side walls upstanding therefrom, an eye means at the upper corners of said basket, a rectangular substantially rigid floor member holding said side walls of said basket member in spread position, said floor member having arcuate recesses at its corners and bracket means mounted at the corners of said floor member; a support frame having four pairs of bars each of said pairs of bars being pivotally attached together intermediate their ends, each of said pairs of bars being associated with one of said side walls when said basket is supported by said support frame, and pin means pivotally securing the upper and lower ends of each of said pairs of bars to like ends of adjacent pairs of bars, and hook means mounted on said pin means at said upper ends detachably securing said basket member to said support frame; and rod members substantially the same height as said side walls, said rod members being held at one end by said recesses and said bracket means and being held at the other end by said eye means, said rod members supporting said side walls when said basket member is detached from said supporting frame.

References Cited in the file of this patent

UNITED STATES PATENTS

| | | |
|---|---|---|
| D. 177,208 | Berlin | Mar. 27, 1956 |
| 2,570,446 | Hoffman | Oct. 9, 1951 |
| 2,653,330 | Nolan | Sept. 29, 1953 |
| 2,742,651 | Ward | Apr. 24, 1956 |
| 2,812,518 | O'Brien | Nov. 12, 1957 |

FOREIGN PATENTS

| | | |
|---|---|---|
| 3,970 | Great Britain | 1897 |
| 14,979 | Great Britain | 1898 |
| 6,101 | Great Britain | 1902 |
| 42,684 | France | June 12, 1933 |

OTHER REFERENCES

Perfection Specialties—Booklet by Perfection Mfg. Co., Fig. No. 4 on page 8.